US009776214B2

(12) United States Patent
Vallelly et al.

(10) Patent No.: US 9,776,214 B2
(45) Date of Patent: Oct. 3, 2017

(54) MULTI-DECK SCREENING ASSEMBLY

(71) Applicant: CDE Global Limited, Cookstown, County Tyrone (GB)

(72) Inventors: Kevin Vallelly, Maghera (GB); Robert Lyttle, Dungannon (GB)

(73) Assignee: CDE Global Limited, Cookstown (GB)

( * ) Notice: Subject to any disclaimer, the term of this patent is extended or adjusted under 35 U.S.C. 154(b) by 0 days.

(21) Appl. No.: 15/015,701

(22) Filed: Feb. 4, 2016

(65) Prior Publication Data

US 2016/0228919 A1 Aug. 11, 2016

(30) Foreign Application Priority Data

Feb. 6, 2015 (GB) .................................. 1501982.1

(51) Int. Cl.
*B03C 1/00* (2006.01)
*B07B 11/06* (2006.01)
(Continued)

(52) U.S. Cl.
CPC .............. *B07B 11/06* (2013.01); *B07B 1/005* (2013.01); *B07B 1/28* (2013.01); *B07B 1/40* (2013.01);
(Continued)

(58) Field of Classification Search
CPC B07B 11/06; B07B 1/005; B07B 1/28; B07B 1/40; B07B 9/02; B07B 2201/04
(Continued)

(56) References Cited

U.S. PATENT DOCUMENTS

| | | | | |
|---|---|---|---|---|
| 2,276,333 A * | 3/1942 | Ovestrud | ................ | B02C 21/02 |
| | | | | 209/241 |
| 3,647,150 A | 3/1972 | Stephanek | | |
| 4,598,875 A * | 7/1986 | Bronson | .................. | B02C 21/02 |
| | | | | 241/101.76 |
| 5,234,564 A * | 8/1993 | Smith | ..................... | B07B 1/005 |
| | | | | 209/241 |
| 5,341,939 A * | 8/1994 | Aitchison | ................. | B07B 1/42 |
| | | | | 209/319 |
| 6,367,633 B1 * | 4/2002 | Douglas | .................. | B07B 1/005 |
| | | | | 209/311 |
| 6,935,587 B2 * | 8/2005 | Brock | ..................... | B02C 21/02 |
| | | | | 241/101.76 |
| 8,505,738 B2 * | 8/2013 | O'Keeffe | ................ | B07B 1/005 |
| | | | | 209/240 |
| 2003/0173265 A1 * | 9/2003 | Cohen | ..................... | B07B 1/005 |
| | | | | 209/241 |

(Continued)

FOREIGN PATENT DOCUMENTS

| | | |
|---|---|---|
| BE | 1010451 | 8/1998 |
| DE | 7407300 | 6/1974 |

OTHER PUBLICATIONS

UK Examination Report for corresponding UK Application No. GB1501982.1, dated Jul. 13, 2015.

*Primary Examiner* — Terrell Matthews
(74) *Attorney, Agent, or Firm* — Gardner, Linn, Burkhart & Flory, LLP

(57) ABSTRACT

A multi-deck screening assembly includes a plurality of vertically-stacked downwardly-sloping screen decks, each with grading apertures through which under-sized material may pass, while over-sized material passes over a lower discharge end of each screen deck. The screen decks are mounted on a common frame, which is mounted on a chassis and provided with vibration device. The screen decks include an upper deck, an intermediate deck below for receiving under-sized material from the upper deck, and a lower deck below the intermediate deck for receiving under-sized material from the intermediate screen deck. A first chassis-mounted stockpile conveyor receives over-sized material from the lower deck, a second chassis-mounted stockpile conveyor receives over-sized material from the intermediate deck, and a third stockpile conveyor receives over-sized material from the upper deck. A transfer conveyor is operable to deliver over-sized material from the discharge end of the upper deck onto the third stockpile conveyor.

14 Claims, 5 Drawing Sheets

(51) Int. Cl.
   *B07B 1/00*    (2006.01)
   *B07B 1/40*    (2006.01)
   *B07B 13/16*   (2006.01)
   *B65G 47/20*   (2006.01)
   *B07B 1/28*    (2006.01)
   *B07B 9/02*    (2006.01)

(52) U.S. Cl.
   CPC ............... *B07B 9/02* (2013.01); *B07B 13/16* (2013.01); *B65G 47/20* (2013.01); *B07B 2201/04* (2013.01)

(58) Field of Classification Search
   USPC .................. 209/257, 260, 311, 316–317
   See application file for complete search history.

(56) References Cited

U.S. PATENT DOCUMENTS

| | | | |
|---|---|---|---|
| 2014/0061102 A1* | 3/2014 | Sauser | B07B 1/28 209/315 |
| 2014/0108182 A1 | 4/2014 | Hoban | |
| 2015/0027932 A1* | 1/2015 | Andersen | B07B 1/005 209/3 |
| 2015/0103614 A1* | 4/2015 | Brock | B28C 7/0418 366/3 |

\* cited by examiner

MULTI-DECK SCREENING ASSEMBLY

FIELD OF THE INVENTION

This invention relates to a multi-deck screen assembly, and in particular to a multi-deck screen assembly having three vertically spaced screen decks and to a compact discharge arrangement thereof.

BACKGROUND OF THE INVENTION

Vibrating screens are commonly used to sort, grade or classify particulate material, such as sand and aggregate.

A typical vibrating screen comprises a frame, typically defined by a pair of substantially parallel side walls interconnected by transversely extending bridging members, upon which is mounted a polyurethane screen deck having small openings or slots for water and/or undersize particles to pass through.

The frame is mounted on a chassis via resilient mountings and the frame, and thus the screen, is typically vibrated by means of a device including a pair of counter rotating rotors defining eccentric masses driven by one or more drive motors, to impart circular or reciprocating vibratory motion to the screen. In a grading screen, the screen deck is typically arranged at a predetermined slope and material to be graded is delivered onto an upper end of the screen, typically entrained in a flow of water, particularly if they material is also being washed. The screen is vibrated at high frequency to convey the material over the screen deck and to cause undersize material (and water if present) to pass through the openings in the screen deck, oversize material being discharged from a lower end of the deck onto a stockpile conveyor or into a collection bay or hopper.

It is known to provide a multi-deck screening assembly to produce a number of different grades of product. A plurality of screen decks, typically two or three decks, are typically arranged one above the other, and generally parallel to each other, each with a downward slope from an upper receiving end to a lower discharge end at which over-sized material (relative to the screen deck concerned) can be discharged. Material of a size in excess of the size of the screening apertures of each screen deck is discharged under gravity action from the lower end of the respective deck onto a respective stockpile conveyor, whereas under-sized material able to pass downwardly through the screening apertures of the respective screen deck falls under gravity onto the deck below, where the further screening action takes place, or into a collection region or sump in the case of the lowest deck. A triple deck screen assembly can grade feed material into four or more separate grades (particle size) of product.

A problem with existing triple deck screen assemblies is how to arrange each of the stockpile conveyors within the dimensional constraints of the chassis while enabling over-sized material from each deck to be delivered onto a respective stockpile conveyor. Typically a first stockpile conveyor extends laterally from a first side of the chassis, transverse to the screening decks, for conveying oversized material from a lower deck, a second stockpile conveyor extending laterally from a second side of the chassis, opposite the first side, for conveying oversized material from an intermediate deck, typically via a intervening delivery chute, and a third stockpile conveyor extends from an end of the chassis, substantially perpendicular to the first and second stockpile conveyors and aligned with a longitudinal axis of the chassis, for conveying oversized material from an upper deck, typically via a intervening delivery chute. This arrangement increases the overall length of the screening assembly and also restricts access to the discharge end of each deck. As such, one or more of the stockpile conveyors and/or delivery chutes typically require removal to provided access to the discharge ends of the decks.

SUMMARY OF THE INVENTION

According to the present invention there is provided A multi-deck screening assembly comprising a plurality of vertically-stacked downwardly-sloping screen decks, each screen deck having a plurality of grading apertures formed therethrough whereby under-sized material may pass through the apertures while over-sized material passes over a lower discharge end of each screen deck, the plurality of screen decks being mounted on a common frame, the frame being mounted on a chassis via resilient mounts and being provided with vibration generating device for imparting vibration to the screen decks, the plurality of screen decks comprising an upper deck, an intermediate deck mounted below the upper deck for receiving under-sized material from the upper deck, and a lower deck mounted below the intermediate deck for receiving under-sized material from the intermediate screen deck, a first stockpile conveyor being mounted on the chassis arranged to receive over-sized material from the discharge end of the lower deck, a second stockpile conveyor being mounted on the chassis to receive over-sized material from the discharge end of the intermediate deck, and a third stockpile conveyor being arranged to receive over-sized material from the discharge end of the upper deck, wherein a transfer conveyor is provided adjacent the discharge end of the upper deck, the transfer conveyor being arranged to deliver over-sized material from the discharge end of the upper deck onto the third stockpile conveyor.

The transfer conveyor may extend transverse to the screen decks to discharge material onto the third stockpile to one side of the chassis. Optionally, the transfer conveyor is mounted above a loading end of the second stockpile conveyor.

A first delivery chute may be provided for transferring over-sized material from the discharge end of the upper deck onto the transfer conveyor. A second delivery chute may be provided for transferring over-sized material from the discharge end of the intermediate deck onto the second stockpile conveyor, the second delivery chute being mounted beneath and substantially parallel to the first delivery chute. Optionally, the second delivery chute is mounted above a loading end of the first stockpile conveyor.

In one embodiment the transfer conveyor and the first and second delivery chutes may be mounted on a carriage slidably mounted on the chassis for movement between a first position, wherein the first chute is aligned with the discharge end of the intermediate deck, and the second chute is aligned with the discharge end of the upper deck, and a second position, wherein the first chute is spaced from the discharge end of the intermediate deck and the second chute is spaced from the discharge end of the upper deck, to permit access to the discharge ends of the lower, intermediate and upper decks for maintenance when the carriage is in its second position. The carriage may be moveable in a direction substantially parallel to a longitudinal axis of the screen decks. The carriage may be mounted on guide rails or tracks provided on the chassis.

In one embodiment a control panel may be mounted on an end of the chassis, the carriage being mounted between the discharge ends of the screen decks and the control panel.

Optionally, the first and second stockpile conveyors extend laterally from the chassis. The first and second stockpile conveyors may extend from opposite sides of the chassis. The first and second stockpile conveyors may extend parallel to one another. The third stockpile conveyor may be mounted on a side of the chassis adjacent the first stockpile conveyor.

In one embodiment the third stockpile conveyor may be detachable from the chassis. The first, second and third stockpile conveyors may comprise endless belt conveyors. The first and second stockpile conveyor may be foldable between outwardly extending operative positions and folded transport positions.

These and other objects, advantages and features of the invention will become apparent upon review of the following specification in conjunction with the drawings.

BRIEF DESCRIPTION OF THE DRAWINGS

A screening assembly in accordance with an embodiment of the present invention will now be described, by way of example only, with reference to the accompanying drawings, in which.

DETAILED DESCRIPTION OF THE PREFERRED EMBODIMENTS

Figure 1:
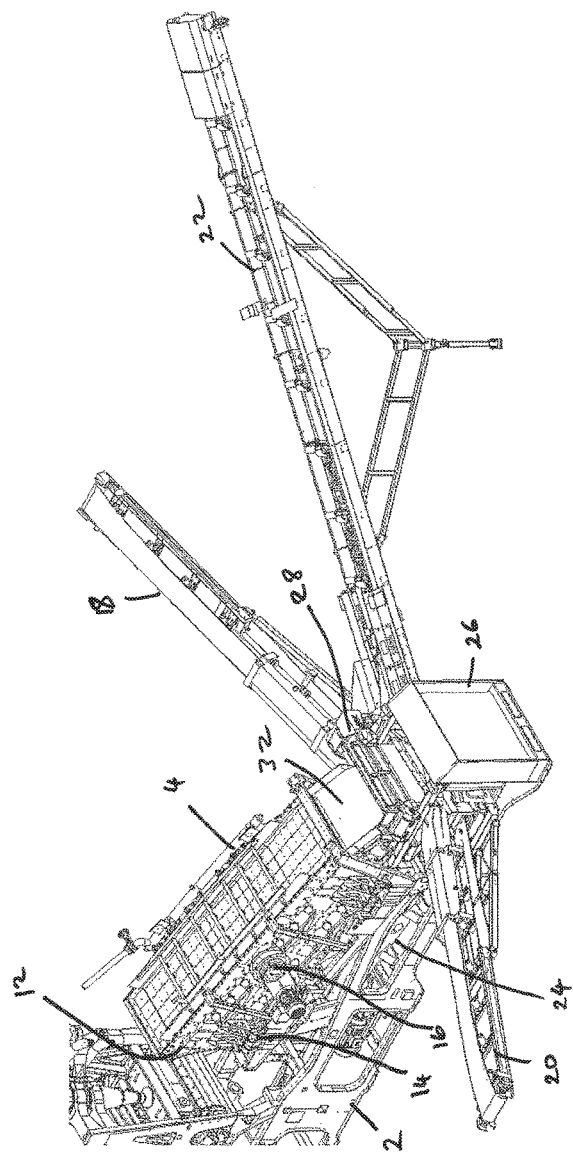
FIG. 1 is a perspective view of a screening apparatus in accordance with an embodiment of the present invention.
Figure 2:
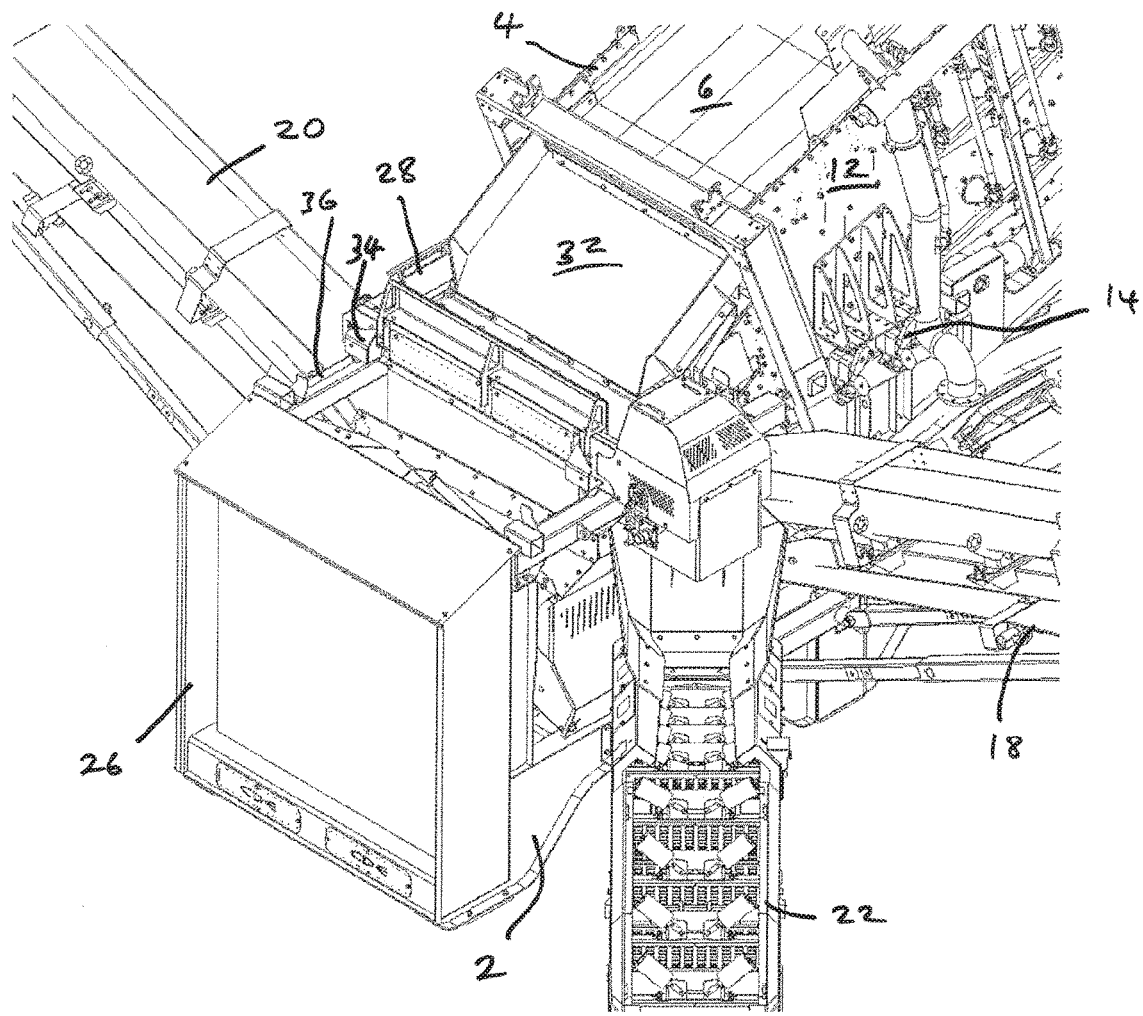
FIG. 2 is a detailed perspective view of the screening apparatus of FIG. 1.
Figure 3:
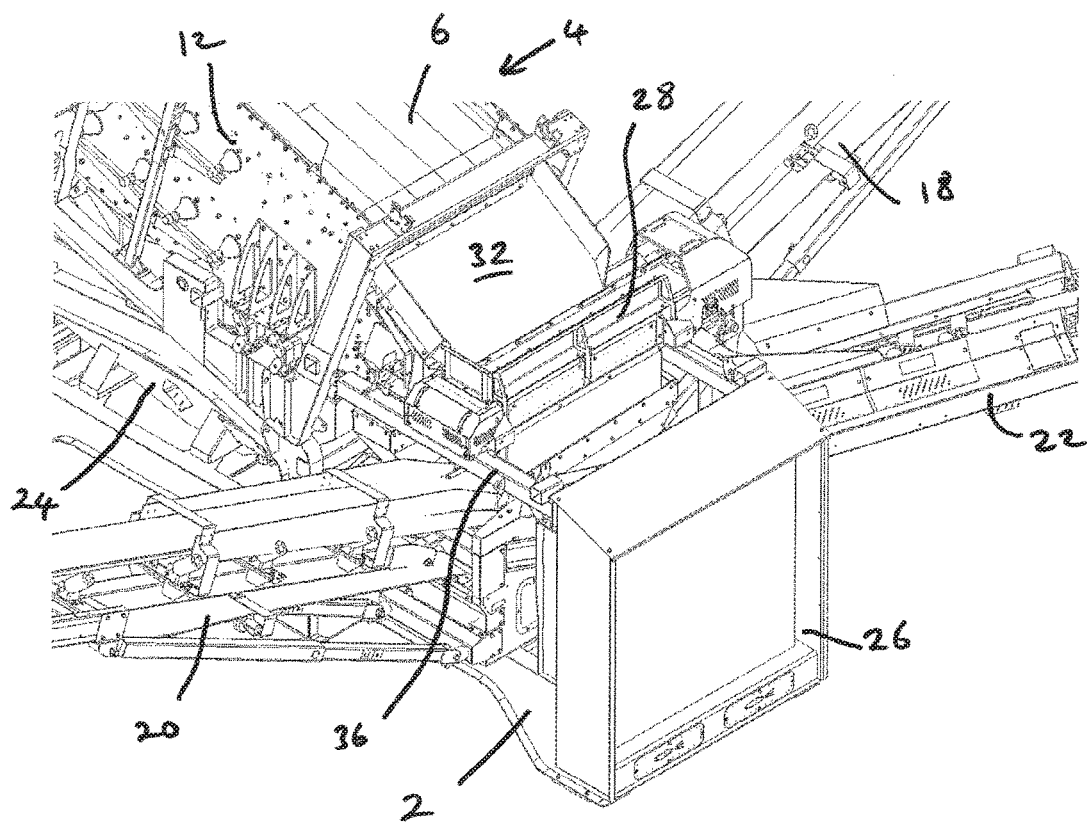
FIG. 3 is a further detailed perspective view of the screening apparatus of FIG. 1.

A multi-deck screening assembly in accordance with the present invention is illustrated in FIG. 1. The screening assembly comprises an elongate chassis 2 having mounted thereon a triple deck grading screen 4 comprising substantially parallel upper 6, intermediate 8 and lower 10 decks mounted on a frame 12 defined by a pair of substantially parallel side walls interconnected by transversely extending bridging members. Each of the upper, intermediate and lower screen decks 6,8,10 comprises a polyurethane screen having small openings or slots for water and/or undersize particles to pass through. The openings or slots in the upper deck 6 are larger than those of the intermediate deck 8, which are in turn larger than those of the lower deck 10.

The frame 12 of the grading screen 4 is mounted on the chassis 2 via resilient mountings 14 and a vibration generating device 16, in the form of an eccentrically mounted motor driven rotor, is mounted on the frame 12 for imparting circular or reciprocating vibratory motion to the decks of the grading screen 4.

Each deck 6,8,10 of the grading screen 4 has a downward slope from an upper receiving end to a lower discharge end at which over-sized material (relative to the screen deck concerned) can be discharged. Material of a size in excess of the size of the screening apertures of each screen deck is discharged under gravity action from the lower end of the respective deck 6,8,10 onto a respective stockpile conveyor 18,20,22, whereas under-sized material able to pass downwardly through the screening apertures of the respective screen deck 6,8,10 falls under gravity onto the deck below, where the further screening action takes place, or into a sump 24 in the case of the lower deck 10.

A control panel 26 is mounted on one end of the chassis 2, adjacent a discharge end of the grading screen 4. Each of the stockpile conveyors 18,20,22 are located between control panel 26 and the grading screen 4. A first stockpile belt conveyor 18 is mounted on the chassis 2 arranged to receive over-sized material from the discharge end of the lower deck 10. The first stockpile conveyor 18 extends laterally from the chassis 2 to a first side of the chassis 2, substantially perpendicular to a longitudinal axis of the grading screen 4, a loading end of the first stockpile conveyor 18 being located directly beneath the discharge end of the lower deck 10 of the grading screen 4.

A second stockpile conveyor 20 is mounted on the chassis 2 to receive over-sized material from the discharge end of the intermediate deck 8, via a first delivery chute 30 adapted to receive over-size material from the intermediate deck 8 of the grading screen 4. The second stockpile conveyor 20 extends laterally from the chassis 2, perpendicular to the grading screen 4, to a second side of the chassis 2, opposite the first side of the chassis 2, such that the second stockpile conveyor 20 extends parallel to and in an opposite direction to the first stockpile conveyor 18. A loading end of the second stockpile conveyor 20 is arranged alongside the loading end of the first stockpile conveyor 18 to receive material falling from the first delivery chute 30.

Figure 5:
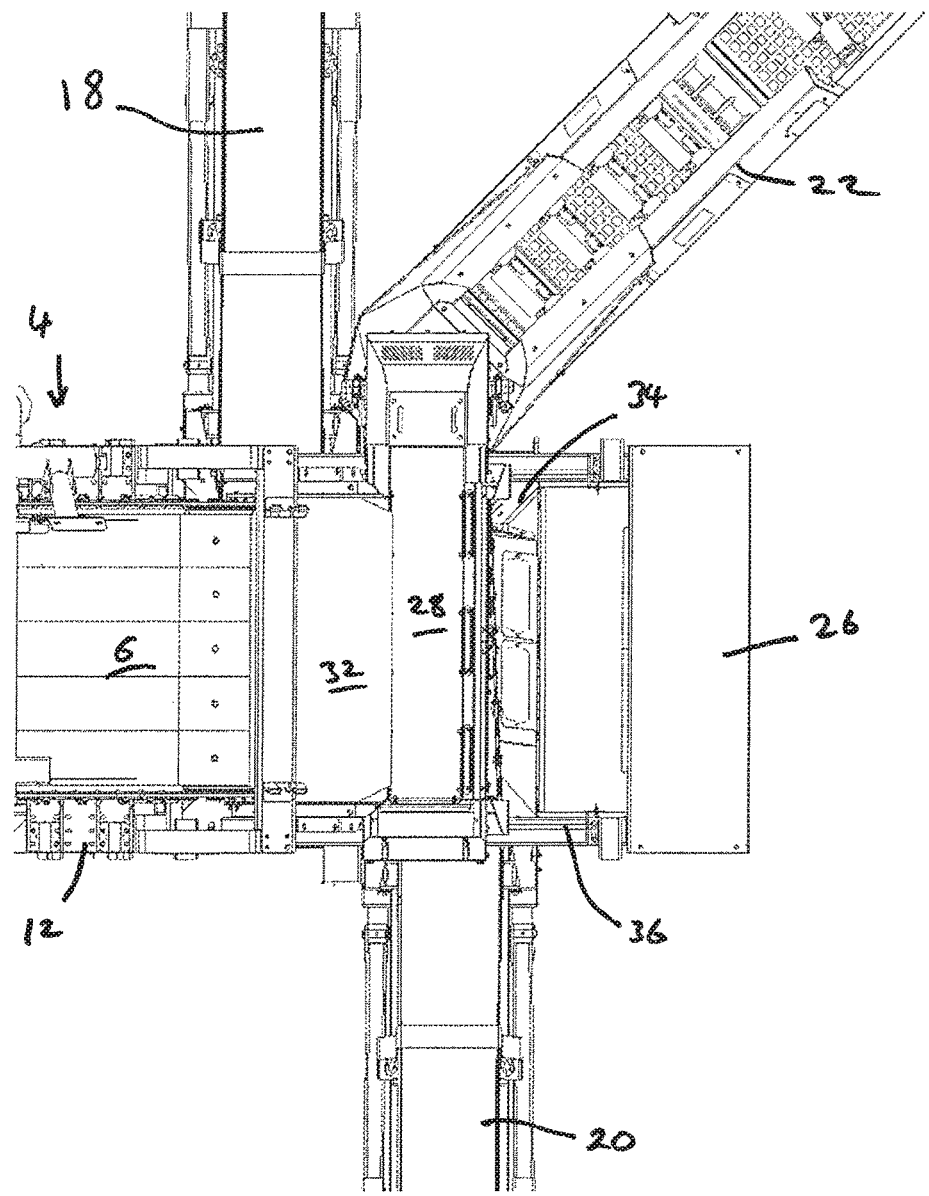
FIG. 5 is a plan view of a portion of the screening apparatus of FIG. 1.

A third stockpile conveyor 22 is arranged to receive over-sized material from the discharge end of the upper deck 6. A transfer belt conveyor 28 is provided adjacent the discharge end of the upper deck 6, the transfer conveyor 28 being arranged to deliver over-sized material from the discharge end of the upper deck 6 onto the third stockpile conveyor 22. The transfer conveyor 28 extends transverse to the chassis 2 and to the grading screen 4 and is located above the loading end of a second stockpile conveyor 20. The transfer conveyor 28 is arranged to deliver material from the discharge end of the upper deck 6 onto a loading end of the third stockpile conveyor 22, located to the one side of chassis 2 alongside the first stockpile conveyor 18, as best shown in FIG. 5.

The third stockpile conveyor 22 may extend at an angle of approximately 45-degrees to the first stockpile conveyor 18 and to the longitudinal axis of the chassis 2. The angle of the third stockpile conveyor 22 may be adjustable with respect to the chassis 2.

The first, second and third stockpile conveyors 18,20,22 may be foldable against the sides of the chassis 2 for transportation and/or may be removable from the chassis 2 (in particular in the case of the third stockpile conveyor).

A second delivery chute 32 is provided for transferring material from the discharge end of the upper deck 6 of the grading screen 4 onto the transfer conveyor 28, the second delivery chute 32 being mounted above and substantially parallel to the first delivery chute 30.

Figure 4:
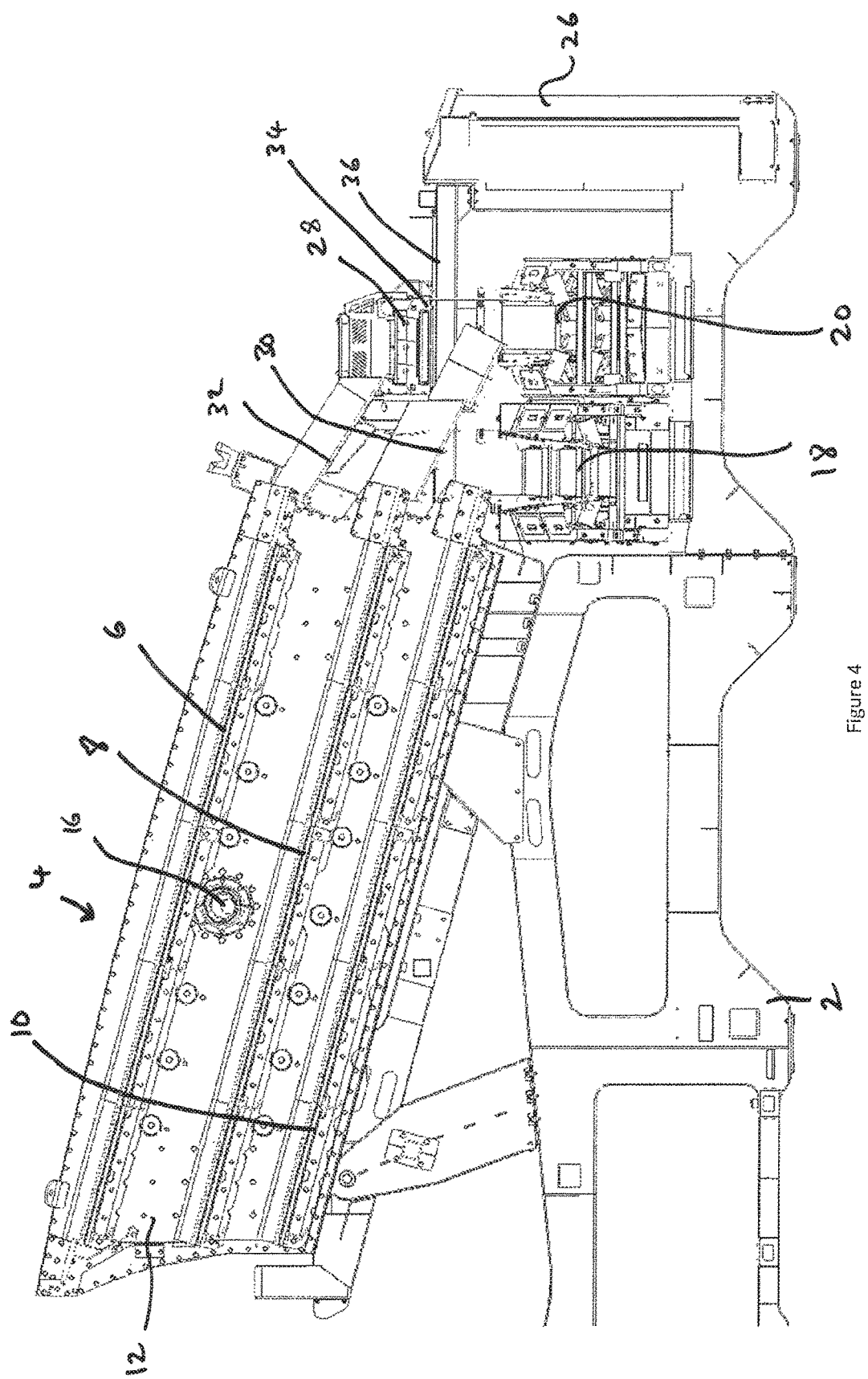
FIG. 4 is a longitudinal sectional view of the screening apparatus of FIG. 1.

In order to facilitate access to the discharge ends of the intermediate and lower decks 8,10 of the grading screen 4, the first and second delivery chutes 30,32 and the transfer conveyor 28 are mounted on a carriage 34 slidable mounted on the chassis 2 via guide rails 36 for movement between an operative position, shown in FIG. 4, wherein the first chute 30 is aligned with the discharge end of the intermediate deck 8, and the second chute 32 is aligned with the discharge end of the upper deck 6, and a maintenance position, wherein the first chute 30 is spaced from the discharge end of the intermediate deck 8 and the second chute 32 is spaced from the discharge end of the upper deck 6, and wherein the transfer conveyor 28 is adjacent a rear side of the control panel 26. When the carriage 34 is in its maintenance position, access is granted to the discharge ends of each of the lower 10, intermediate 8 and upper 6 decks of the grading screen 4 for maintenance, for example to permit replacement the polyurethane screen mats of the grading screen 4, without requiring substantial disassembly of the apparatus, as is typically required with prior art arrangements.

The compact arrangement of the first, second and third stockpile conveyors 18,20,22, facilitated by the provision of the transfer conveyor 28, enables a triple deck grading screen to take up the same footprint as that of a twin deck grading screen.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A multi-deck screening assembly comprising:
    a plurality of vertically-stacked downwardly-sloping screen decks, each of the screen decks having a plurality of grading apertures formed therethrough whereby under-sized material may pass through the apertures while over-sized material passes over a lower discharge end of each screen deck;
    the plurality of screen decks being mounted on a common frame;
    wherein the frame is mounted on a chassis via resilient mounts and is provided with a vibration generating device for imparting vibration to the screen decks;
    the plurality of screen decks comprising:
        an upper deck;
        an intermediate deck mounted below the upper deck for receiving under-sized material from the upper deck; and
        a lower deck mounted below the intermediate deck for receiving under-sized material from the intermediate screen deck;
    a first stockpile conveyor mounted on the chassis and operable to receive over-sized material from the discharge end of the lower deck;
    a second stockpile conveyor mounted on the chassis and operable to receive over-sized material from the discharge end of the intermediate deck;
    a third stockpile conveyor operable to receive over-sized material from the discharge end of the upper deck;
    a transfer conveyor provided adjacent the discharge end of the upper deck, wherein the transfer conveyor is operable to deliver over-sized material from the discharge end of the upper deck onto the third stockpile conveyor;
    a first delivery chute for transferring over-sized material from the discharge end of the upper deck onto the transfer conveyor; and
    a second delivery chute for transferring over-sized material from the discharge end of the intermediate deck onto the second stockpile conveyor, the second delivery chute being mounted beneath the first delivery chute;
    wherein the transfer conveyor and the first and second delivery chutes are mounted on a carriage slidably mounted on the chassis for movement between a first position in which the first chute is aligned with the discharge end of the intermediate deck and the second chute is aligned with the discharge end of the upper deck, and a second position in which the first chute is spaced from the discharge end of the intermediate deck and the second chute is spaced from the discharge end of the upper deck, to permit access to the discharge ends of the lower, intermediate and upper decks for maintenance when the carriage is in the second position.

2. The assembly of claim 1, wherein the transfer conveyor extends transverse to the screen decks and is operable to discharge material onto the third stockpile conveyor to one side of the chassis.

3. The assembly of claim 2, wherein the transfer conveyor is mounted above a loading end of the second stockpile conveyor.

4. The assembly of claim 1, wherein the second delivery chute is mounted above a loading end of the first stockpile conveyor.

5. The assembly of claim 1, wherein the carriage is moveable in a direction substantially parallel to a longitudinal axis of the screen decks.

6. The assembly of claim 5, wherein the carriage is mounted on guide rails or tracks provided on the chassis.

7. The assembly of claim 5, wherein a control panel is mounted on an end of the chassis, and the carriage is mounted between the discharge ends of the screen decks and the control panel.

8. The assembly of claim 1, wherein the first and second stockpile conveyors extend laterally from the chassis.

9. The assembly of claim 8, wherein the first and second stockpile conveyors extend from opposite sides of the chassis.

10. The assembly of claim 8, wherein the first and second stockpile conveyors extend parallel to one another.

11. The assembly of claim 9, wherein the third stockpile conveyor is mounted on a side of the chassis adjacent the first stockpile conveyor.

12. The assembly of claim 1, wherein the third stockpile conveyor is detachable from the chassis.

13. The assembly of claim 1, wherein the first, second and third stockpile conveyors comprise endless belt conveyors.

14. The assembly of claim 1, wherein the first and second stockpile conveyors are each foldable between outwardly extending operative positions and folded transport positions.

* * * * *